(12) United States Patent
Niimi et al.

(10) Patent No.: US 6,646,374 B1
(45) Date of Patent: *Nov. 11, 2003

(54) LIGHT EMITTING ELEMENT WITH MUTUALLY CONFRONTING ELECTRODES

(75) Inventors: Norikazu Niimi, Kasugai (JP); Michio Asai, Nagoya (JP)

(73) Assignee: NGK Insulators, Ltd., Nagoya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/325,920

(22) Filed: Jun. 4, 1999

(30) Foreign Application Priority Data

Jun. 8, 1998 (JP) .......................................... 10-159724

(51) Int. Cl.[7] .............................. H01J 17/49; H01J 1/62; H01J 63/04; H01J 17/16; H01J 61/30
(52) U.S. Cl. ....................... 313/582; 313/483; 313/484; 313/493; 313/634; 445/23; 445/24; 445/25
(58) Field of Search ...................... 313/490–93, 483–84, 313/485, 631–32, 634–35, 582, 586–587, 623, 495–97; 445/23–25

(56) References Cited

U.S. PATENT DOCUMENTS 4,204,721 A    5/1980   Hubert et al.
4,990,826 A  * 2/1991   Cocks et al. ............. 313/493 X
5,811,935 A  * 9/1998   Pinker et al. ................ 313/632
6,118,215 A  * 9/2000   Byrum et al. ................ 313/634

FOREIGN PATENT DOCUMENTS

EP    0 581 376 A1    2/1994
NL    7415840         6/1976

* cited by examiner

*Primary Examiner*—Vip Patel
*Assistant Examiner*—Joseph Williams
(74) *Attorney, Agent, or Firm*—Burr & Brown

(57) ABSTRACT

A light emitting element comprises a housing formed by allowing respective first principal surfaces of a rectangular upper housing member made of glass material and having a recess at a central portion on its first principal surface and a rectangular lower housing member made of glass material and having a recess at a central portion on its first principal surface as well to make contact with each other so that they are thermally glued by pressing under a pressure in a predetermined atmosphere; a cavity formed by the respective recesses in the housing and enclosed with at least one of a gas and a light emitting substance; and two lead wires confronted with each other with the cavity interposed therebetween. Accordingly, it is possible to simultaneously realize the integration and the miniaturization of the electronic tube and present the display expression for information transmission at a high brightness.

6 Claims, 13 Drawing Sheets

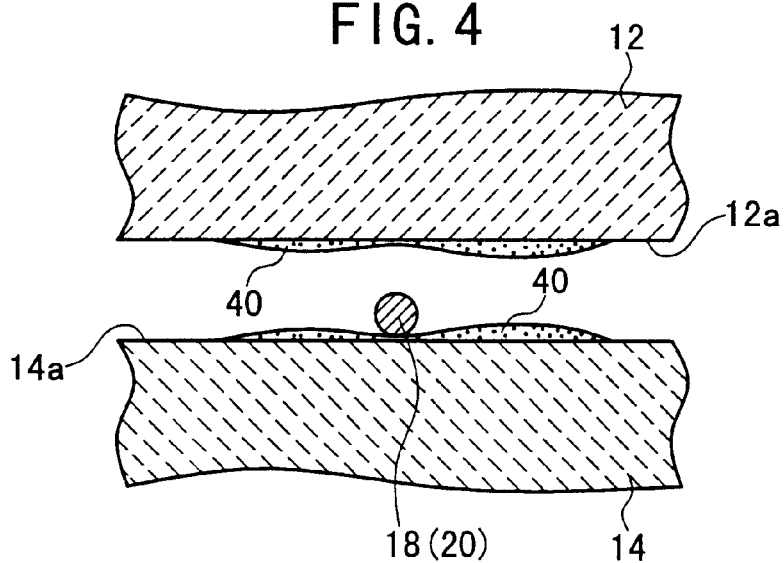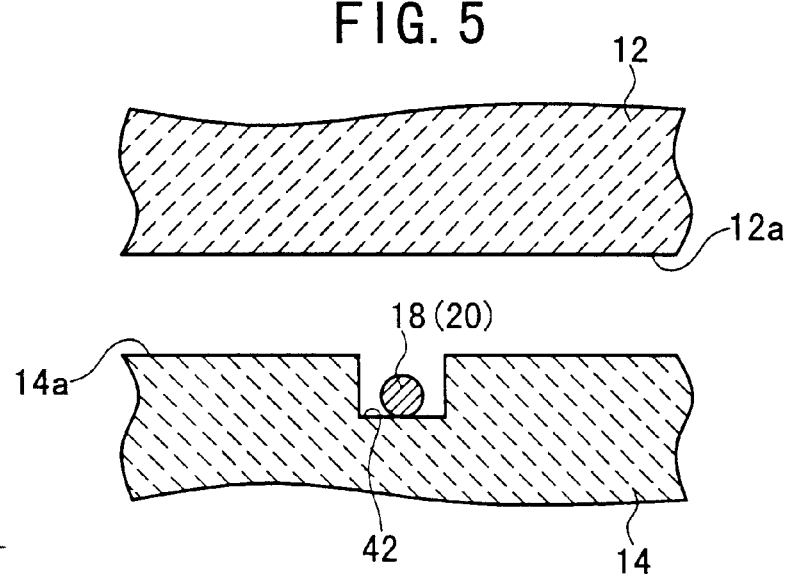

LIGHT EMITTING ELEMENT WITH MUTUALLY CONFRONTING ELECTRODES

BACKGROUND OF THE INVENTION

1. Field of the Invention

The present invention relates to a light emitting element and a method for producing the same, including an electronic tube which utilizes the discharge light emission of at least one of a gas and a light emitting substance enclosed in a formed product made of, for example, a glass material.

2. Description of the Related Art

In general, the light source, which utilizes the discharge light emission of at least one of the gas and the light emitting substance enclosed in a tube made of glass, includes electronic tubes such as mercury lamps, fluorescent tubes, sodium lamps, carbon arc lamps, zirconium discharge lamps, neon tubes, and flash discharge lamps.

The electronic tube as described above is manufactured, for example, such that an anode bar is fused to one end of a cylindrical glass tube, and then a cathode bar is fused to the other end of the glass tube in a predetermined gas atmosphere (atmosphere containing the gas to be enclosed) to enclosed the predetermined gas in the glass tube.

It is contemplated that such an electronic tube is utilized to display, for example, images and characters at the outdoor.

In such a situation, it is conceived that a large number of electronic tubes are arranged so that the light is selectively emitted from the electronic-tubes. However, the respective electronic tubes exist as single members. Therefore, when the large number of electronic tubes are arranged, the scale is inevitably large. As a result, problems arise in that the installation space is enlarged, the wiring operation is complicated, and the production cost becomes expensive.

Under the circumstances, it is expected that the electronic tube itself is allowed to have a miniature size. However, if the electronic tube is miniaturized, then the distance between the anode and the cathode is decreased, and the pressure at the inside of the glass tube is further increased during the light emission. Therefore, it is necessary to increase the strength of the glass tube in association with the miniaturization of the electronic tube.

SUMMARY OF THE INVENTION

The present invention has been made taking the foregoing problems into consideration, an object of which is to provide a light emitting element which makes it possible to simultaneously realize the integration and the miniaturization of the electronic tube and present the display expression for information transmission at a high brightness.

Another object of the present invention is to provide a method for producing a light emitting element, in which it is possible to easily produce the light emitting element which makes it possible to simultaneously realize the integration and the miniaturization of the electronic tube and present the display expression for information transmission at a high brightness.

According to the present invention, there is provided a light emitting element formed by confronting at least two glass members with each other in a predetermined atmosphere and thermally gluing them under a pressure; the light emitting element comprising a cavity enclosed with at least one of a gas and a light emitting substance at its inside; and mutually confronting electrodes provided for the cavity interposed therebetween.

The cavity, in which at least one of the gas and the light emitting substance is enclosed, is formed in the formed product which is manufactured by thermally gluing the glass members under the pressure. The electric power is applied to the electrodes which are opposed to one another with the cavity interposed therebetween. Thus, the discharge light emission is effected by at least one of the gas and the light emitting substance enclosed in the cavity. That is, one cavity functions as one electronic tube.

Therefore, when a large number of electronic tubes are integrated with each other in order to make display for information transmission, it is convenient that a large number of cavities are integrated with each other. In the present invention, the cavity is formed by thermally gluing the glass members. Therefore, it is possible to integrate the large number of cavities at a high degree of integration. Accordingly, it is also possible to easily realize the miniaturization thereof.

As described above, according to the light emitting element concerning the present invention, it is possible to simultaneously realize the integration and the miniaturization of the electronic tube and present the display expression for information transmission at a high brightness.

In the arrangement described above, it is also preferable that the electrodes are constructed by lead wires fixed on a surface at which the glass members contact with each other. Alternatively, the electrodes may be constructed by thin films formed by printing on a surface at which the glass members contact with each other. Especially, when the electrodes are constructed by the thin films, then the labor for wiring arrangement can be eliminated, and it is possible to simplify the production steps. Further, the positioning can be easily performed in order to confront the electrodes with each other with the cavity interposed therebetween.

In the arrangement described above, it is also preferable that the glass member to be used has a bending strength of not less than 1000 kgf /cm$^2$.

For example, in the case of the light emitting element in which argon, mercury or the like is enclosed in the cavity, the glass member having a bending strength of about 1000 kgf /cm$^2$ is used. In the case of the light emitting element in which the gas such as xenon capable of obtaining a high brightness is enclosed, the glass member having a bending strength of about 3000 kgf/cm$^2$ is preferably used.

In general, in order to improve the resolution of the display expression, it is necessary to increase the number of cavities which function as electronic tubes. However, considering the miniaturization in such a situation, it is to conceived that the respective cavities are reduced in size. If the size of the respective cavities is reduced, the pressure in the cavity is increased during the light emission in accordance therewith. However, when the glass member satisfies the condition for the bending strength as described above, the formed product is obtained, which is sufficiently capable of withstanding the pressure in the is cavity. Thus, it is possible to avoid the inconvenience such as the light emission defect.

In the arrangement described above, it is also preferable that the glass member to be used has a coefficient of thermal expansion which is substantially zero or which is near to a coefficient of thermal expansion of the electrode. In this arrangement, the heat resistance is excellent, and the light emitting element is advantageous in resistance to the heat cycle relevant to the repetition of discharge light emission of at least one of the gas and the light emitting substance enclosed in the cavity.

According to another aspect of the present invention, there is provided a method for producing a light emitting element, comprising a first step of providing electrodes on a contact surface of a glass member; and a second step of confronting respective contact surfaces of at least two of the glass members with each other so that they are thermally glued under a pressure in a predetermined atmosphere to produce the light emitting element comprising a cavity enclosed with at least one of a gas and a light emitting substance at its inside; and mutually confronting electrodes provided for the cavity interposed therebetween.

Accordingly, it is possible to simultaneously realize the integration and the miniaturization of the electronic tube, and it is possible to present the display expression for information transmission at a high brightness.

In the present invention, in the first step described above, it is preferable that the electrodes are provided by fixing lead wires on the contact surface of the glass member. It is also preferable that the electrodes are provided by forming a thin film by means of printing on the contact surface of the glass member.

It is also preferable that a glass member having a bending strength of not less than 1000 kgf/cm$^2$ is used as the glass member. It is also preferable that a glass member having a coefficient of thermal expansion which is substantially zero or which is near to a coefficient of thermal expansion of the electrode is used as the glass member.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 illustrates an exemplary method for fixing the lead wire on the contact surface of the housing member;

FIG. 5 illustrates another exemplary method for fixing the lead wire on the contact surface of the housing member;

DESCRIPTION OF THE PREFERRED EMBODIMENTS

Explanation will be made below with reference to FIGS. 1 to 22 for several illustrative embodiments of the light emitting element and the method for producing the same according to the present invention.

Figure 1:
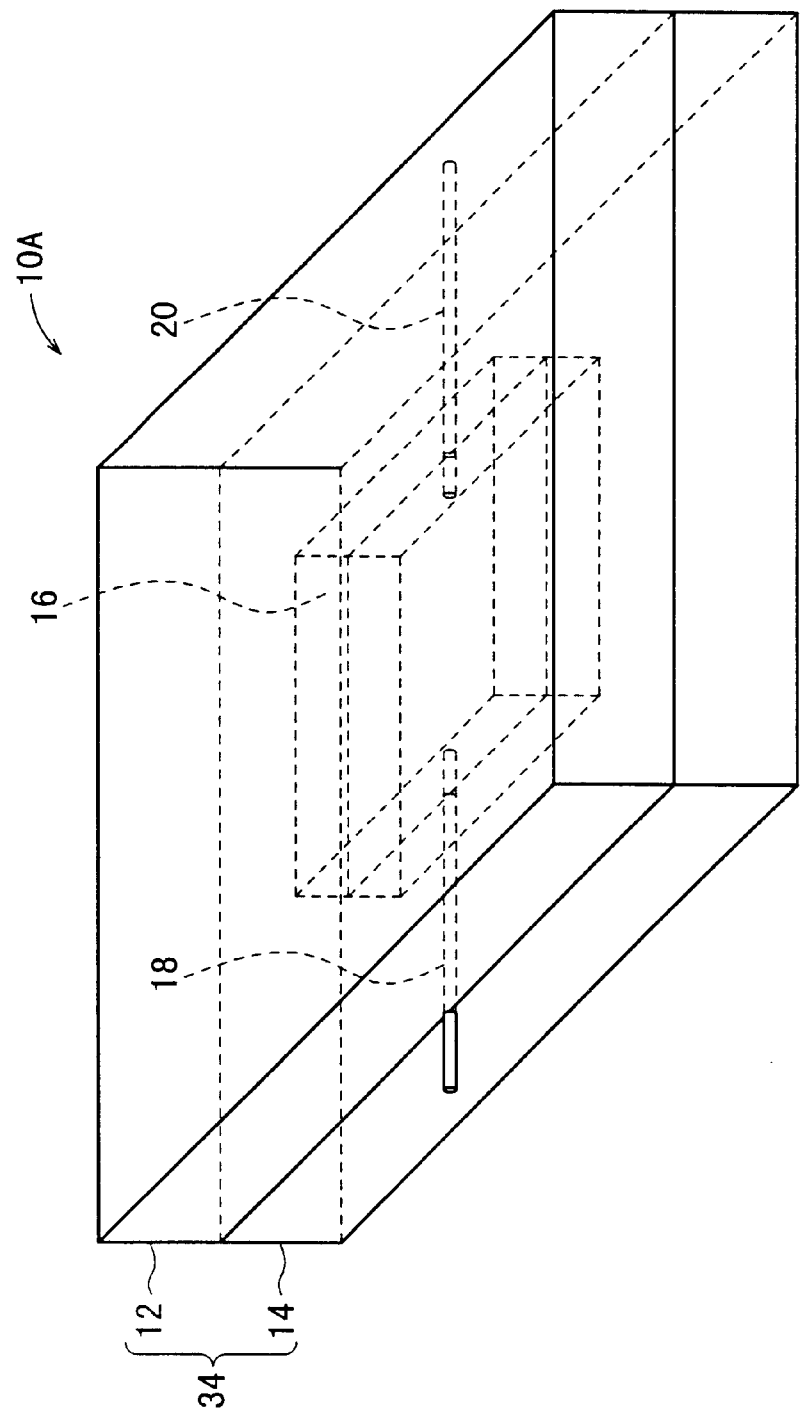
FIG. 1 shows a perspective view illustrating an arrangement of a light emitting element according to a first embodiment.

At first, as shown in FIG. 1, a light emitting element 10A according to the first embodiment comprises a cavity 16 which is formed such that respective first principal surfaces of a rectangular upper housing member 12 and a rectangular lower housing member 14 made of a glass material are allowed to make contact with each other to thermally glue them by pressing under a pressure in a predetermined atmosphere, the cavity 16 including at least one of a gas and a light emitting substance enclosed therein, and two lead wires 18, 20 provided for the cavity 16 interposed therebetween. The lead wires 18, 20 constitute an anode and a cathode respectively.

Figure 2:
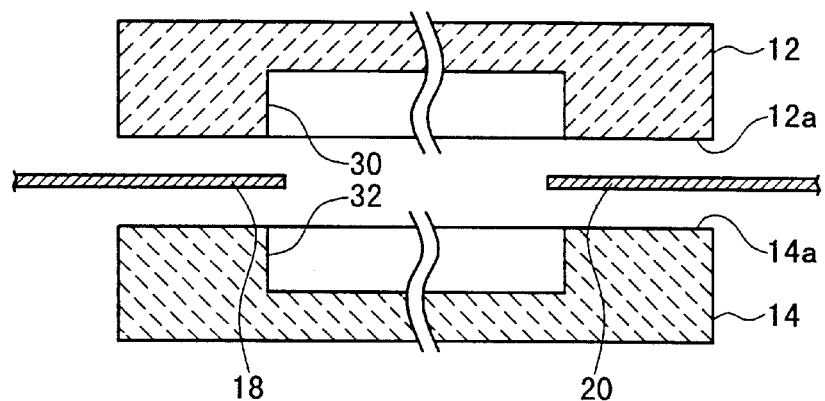
FIG. 2 shows an exploded sectional view illustrating the arrangement of the light emitting element according to the first embodiment.

Specifically, as shown in FIG. 2, the upper housing member 12 has, for example, a rectangular recess 30 which is formed at the central portion of its first principal surface 12a. The lower housing member 14 also has, for example, a to rectangular recess 32 which is formed at the central portion of its first principal surface. Therefore, the surfaces other than the recesses 30, 32 of the respective first principal surfaces 12a, 14a of the upper housing member 12 and the lower housing member 14 function as contact surfaces 12a, 14a respectively.

The upper housing member 12 and the lower housing member 14 are allowed to make contact with each other while confronting the first principal surfaces 12a, 14a with each other to thermally glue them by pressing under a pressure in a predetermined atmosphere. Thus, a housing 34

(formed product) is manufactured, which has the cavity 16 formed by the recesses 30, 32 at the inside.

Before the upper housing member 12 and the lower housing member 14 are allowed to make contact with each other with the first principal surfaces 12a, 14a confronting with each other, for example, the two lead wires 18, 20 are fixed with their respective end surfaces exposed to the recesses 32 on the contact surface 14a of the lower housing member 14. Accordingly, when the upper housing member 12 and the lower housing member 14 are thermally glued by pressing under pressure with each other, the anode and the cathode, which are formed by the lead wires 18, 20 respectively, are confronted with each other with the cavity 16 interposed therebetween. In this embodiment, in order to ensure the discharge light emission in the cavity 16, it is more preferable to allow the respective ends of the lead wires 18, 20 to protrude into the cavity 16.

Figure 6:
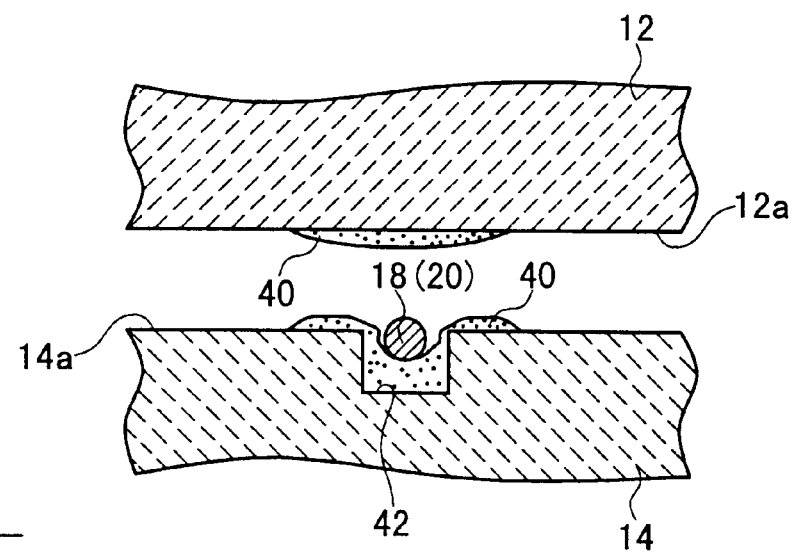
FIG. 6 illustrates still another exemplary method for fixing the lead wire on the contact surface of the housing member.

The method for wiring and fixing the lead wires 18, 20 on the contact surface 14a of the lower housing member 14 includes, for example, a method in which the lead wires 18, 20 are fixed by the aid of a paste 40 made of a glass material applied to the contact surface 14a as shown in FIG. 4, a method in which grooves 42 for lead wires extending from the outer surface to the recess 32 are previously formed on the contact surface 14a, and the lead wires 18, 20 are arranged and fixed in the grooves 42 respectively as shown in FIG. 5, and a method in which the paste 40 made of the glass material is applied to the grooves 42, and the lead wires 18, 20 are fixed in the grooves 42 as shown in FIG. 6. The glass material paste 40 is preferably a paste having the same composition as that of the glass material for constructing the housing 34, for example, in view of the thermal expansion. More preferably, in order to improve the operability, the melting point of the glass is slightly lowered. When the glass material paste 40 is used, it is preferable that the glass material paste 40 is also applied to the contact surface 12a of the upper housing member 12.

In this embodiment, crystallized glass is used as the glass material for constructing the upper housing member 12 and the lower housing member 14. Specifically, this embodiment uses a glass material having its trade name of "Miraclon" (registered trademark) produced by NGK Insulators, Ltd. Miraclon (registered trademark) includes glass ceramic products (Miraclon PP and Miraclon PH) and a chemical strengthening glass product (Miraclon PC).

The glass ceramic product is obtained such that a blended preparation having a specified composition is melted and glassified at a high temperature, which is formed in the same manner as in the ordinary glass production method, followed by a heat treatment under a specified condition to make conversion into an aggregate composed of a large number of uniform microcrystals. The chemical strengthening glass product is obtained such that the glass surface layer is subjected to ion exchange.

The characteristics will now be briefly explained for the crystallized glass specified by Miraclon (registered trademark).

At first, Miraclon PP is obtained by depositing, in glass, about 1 $\mu$m of microcrystals of lithium disilicate ($Li_2O.2SiO_2$) and $\beta$-spodumene ($Li_2O.Al_2O_3 .4SiO_2$), and it has the following features. That is, the appearance is white and opaque. Especially, the bending strength is 3500 kgf/$cm^2$ which is extremely strong and which is not less than three times those of the glass and the porcelain.

Miraclon PH-1 is obtained by depositing, in glass, about 1 $\mu$m of microcrystals of $\beta$-spodumene ($Li_2O.Al_2O_3.4SiO_2$), and it has the following features. That is, the appearance is white and opaque. The coefficient of thermal expansion is about $11 \times 10^7/°$ C. which is small. Miraclon PH-1 is strong against heat shock.

Miraclon PH-3 is obtained by depositing, in glass, about 1 $\mu$m of $\beta$-quartz type microcrystals ($Li_2O.Al_2O_3.4SiO_2$), and it has the following features. That is, the appearance is colorless and transparent. The coefficient of thermal expansion is substantially zero. Therefore, Miraclon PH-3 is extremely strong against heat shock. Miraclon PH-3 is not broken even when it is red-heated to 800° C. followed by introduction into water at 0° C.

Miraclon PC is chemical strengthening glass obtained by ion exchange of $Li^+ \leftarrow \rightarrow Na^+$ for the glass surface layer, and it has the following feature. Especially, the bending strength is 5200 kgf/$cm^2$ which is extremely strong.

As described above, in the light emitting element 10A according to the first embodiment, the cavity 16, in which at least one of the gas and the light emitting substance is enclosed, is formed in the housing 34 manufactured such that the upper housing member 12 and the lower housing member 14 composed of the glass material are thermally glued by pressing under pressure. The electric power is applied to the anode and the cathode (lead wires 18, 20) confronting with each other with the cavity 16 interposed therebetween. Thus, the discharge light emission is effected by at least one of the gas and the light emitting substance enclosed in the cavity 16. That is, one cavity 16 functions as one electronic tube.

Therefore, when the display expression is made for the purpose of information transmission, if a large number of electronic tubes are integrated with each other, then a large number of recesses 30, 32 are formed in the upper housing member 12 and the lower housing member 14, and a large number of cavities 16 are integrated with each other, which are formed by thermally gluing the upper housing member 12 and the lower housing member 14 by pressing under pressure to produce the housing 34. In this embodiment, the cavities 16 are formed by the thermal adhesion of the glass members under pressure. Accordingly, it is possible to integrate the large number of cavities 16 at a high degree of integration, in accordance with which it is also possible to easily realize the miniaturization thereof.

As described above, according to the light emitting element 10A concerning the first embodiment, it is possible to simultaneously realize the integration and the miniaturization of the electronic tube, and it is possible to present the display expression for information transmission at a high brightness. Further, it is also contemplated to apply to color display.

Especially, the light emitting element 10A according to the first embodiment uses a glass material having a bending strength of not less than 1000 kgf/$cm^2$ as the glass material for constructing the upper housing member 12 and the lower housing member 14. Therefore, it is possible to obtain the following effects.

That is, in order to improve the resolution of the display expression, it is necessary to increase the number of cavities 16 which function as electronic tubes. However, considering the miniaturization, it is conceived that the respective cavities 16 are reduced in size.

If the size of the respective cavities 16 is reduced, the pressure in the cavity 16 is increased during the light emission in accordance therewith. However, when the glass member satisfies the bending strength as described above, the formed product (housing 34) is obtained, which is sufficiently-capable of withstanding the pressure in the cavity 16. Thus, it is possible to avoid the inconvenience such as the light emission defect.

The glass material having a bending strength of about 1000 kgf/cm² is used for the light emitting element in which, for example, argon or mercury is enclosed in the cavity. The glass material having a bending strength of about 3000 kgf/cm² is preferably used for the light emitting element in which the gas such as xenon to obtain a high brightness is enclosed in the cavity.

The light emitting element 10A according to the first embodiment is allowed to use the glass material in which the coefficient of thermal expansion is substantially zero, or it is near to the coefficient of thermal expansion of the electrode. In this arrangement, the heat resistance is excellent, and the light emitting element 10A is advantageous in resistance to the heat cycle relevant to the repetition of discharge light emission of at least one of the gas and the light emitting substance enclosed in the cavity 16.

Next, several modified embodiments of the light emitting element 10A according to the first embodiment will be explained with reference to FIGS. 7 and 8.

Figure 7:
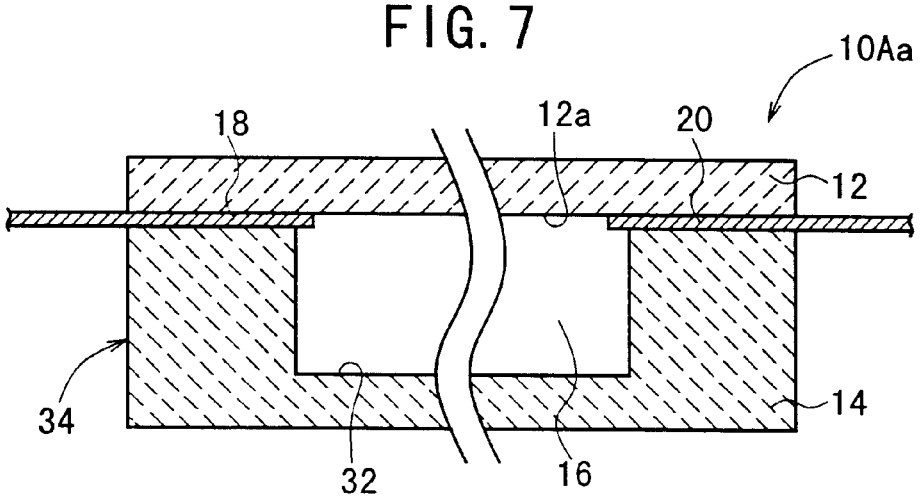
FIG. 7 shows a longitudinal sectional view illustrating a first modified embodiment of the light emitting element according to the first embodiment.

At first, as shown in FIG. 7, a light emitting element 10Aa according to a first modified embodiment comprises a recess 32 provided on only the lower housing member 14. In this embodiment, the cavity 16 is formed by the recess 32 and the first principal surface 12a of the upper housing member 12.

Figure 8:
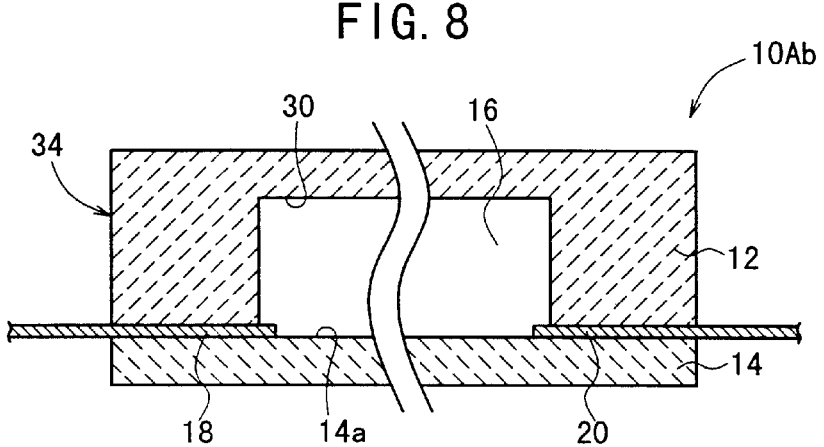
FIG. 8 shows a longitudinal sectional view illustrating a second modified embodiment of the light emitting element according to the first embodiment.

Next, as shown in FIG. 8, a light emitting element 10Ab according to a second modified embodiment comprises a recess 30 provided on only the upper housing member 12. In this embodiment, the cavity 16 is formed by the recess 30 and the first principal surface 14a of the lower housing member 14.

The light emitting elements 10Aa and 10Ab according to the first and second modified embodiments also make it possible to obtain the same effect as that obtained by the light emitting element 10A according to the first embodiment described above.

Figure 9:
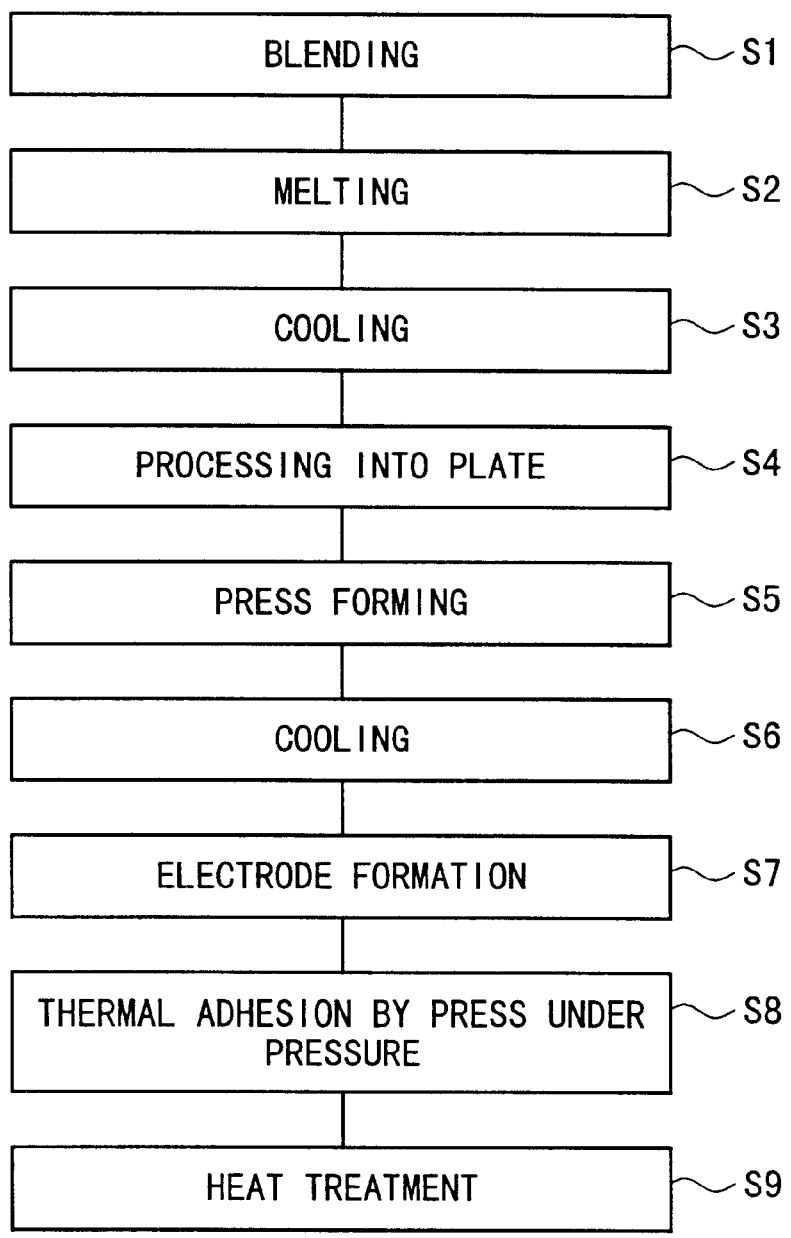
FIG. 9 shows a block diagram depicting steps of a method for producing the light emitting element according to the first embodiment.

Next, a method for producing the light emitting element 10A according to the first embodiment will be explained with reference to a flow chart shown in FIG. 9.

At first, in the step S1, various composition components are blended in order to obtain the desired crystallized glass. For example, when Miraclon PP-4 is obtained, the blending is carried out to give 79% by weight of $SiO_2$, 6.0% by weight of $Al_2O_3$, 12.5% by weight of $Li_2O$, 2.5% by weight of $K_2O$, 3.0% by weight of $P_2O_5$, and 0.3% by weight of $As_2O_3$.

When Miraclon PH-3 is obtained, the blending is carried out to give 65.7% by weight of $SiO_2$, 22.7% by weight of At $Al_2O_3$, 4.2% by weight of $Li_2O$, 0.5% by weight of $Na_2O$, 0.3% by weight of $K_2O$, 1.4% by weight of $P_2O_5$, 0.5% by weight of MgO, 1.7% by weight of TiO, 0.9% by weight of $As_2O_3$, 2.4% by weight of $ZrO_2$, and 0.2% by weight of $Sb_2O_3$.

When Miraclon PC-4 is obtained, the blending is carried out to give 62.9% by weight of $SiO_2$, 17.2% by weight of $Al_2O_3$, 3.5% by weight of $Li_2O$, 5.8% by weight of $Na_2O$, 1.9% by weight of $CaF_2$, 1.0% by weight of TiO, 7.7% by weight of $B_2O_3$, and 0.3% by weight of $As_2O_3$.

Subsequently, in the step S2, the blended preparation is heated and melted at a temperature of 1400 to 1500° C. Subsequently, in the step S3, the melted blended preparation is quenched and quickly cooled with water, oil or the like without causing crystallization in the same manner as in the ordinary glass production method. After that, in the step S4, the cooled blended preparation is processed to have a plate-shaped configuration to prepare a source plate for the upper housing member 12 and the lower housing member 14.

Figure 10:
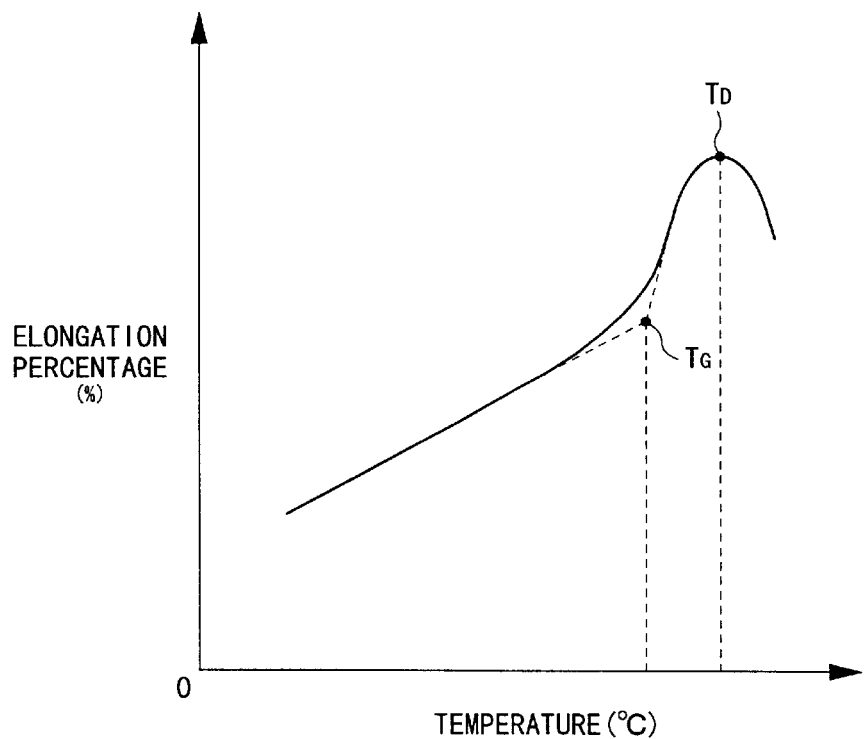
FIG. 10 shows a characteristic curve illustrating the forming temperature for the glass member and the elongation percentage of the glass member.

Subsequently, in the step S5, the source plate is press-formed to produce the upper housing member 12 having the recess 30 at the central portion of the first principal surface 12a and the lower housing member 14 having the recess 3,2 at the central portion of the first principal surface 14a. The press forming is performed at a temperature of not less than a softening point Ts of the source plate. The softening point Ts is a temperature at which the viscosity of the source plate is 4.5×10⁷ poise. In this embodiment, as shown in FIG. 10, for example, the process is carried out at a temperature which is higher by about 40° C. to 50° C. than the yield temperature $T_D$ at which the elongation percentage is maximum. $T_G$ in FIG. 10 represents the temperature at which the melted glass begins to be solidified, i.e., the transition temperature.

Subsequently, in the step S6 shown in FIG. 9, the upper housing member 12 and the lower housing member 14, which have been manufactured by the press forming described above, are cooled, for example, to the room temperature. After that, in the step S7, the lead wires 18, 20 are wired and fixed, for example, on the contact surface 14a of the lower housing member 14. As described above, the method for fixing the lead wires 18, 20 includes, for example, a method in which the lead wires 18, 20 are fixed by the aid of the paste 40 made of the glass material applied to the contact surface 14a (see FIG. 4), a method in which the grooves 42 for the lead wires extending from the outer surface to the recess 32 are previously formed on the contact surface 14a, and the lead wires 18, 20 are arranged and fixed in the grooves 42 respectively (see FIG. 5), and a method in which the paste 40 made of the glass material is applied to the grooves 42, and the lead wires 18, 20 are fixed in the grooves 42 respectively (see FIG. 6).

Subsequently, in the step S8, the upper housing member 12 and the lower housing member 14 are allowed to make contact with each other with their first principal surfaces (contact surfaces) 12a, 14a opposing to one another to thermally glue them by press under a pressure in a predetermined atmosphere, for example, a xenon atmosphere at a high pressure (1 to 20 atms). Thus, the housing 34 is manufactured, which includes, at its inside, the cavity 16 formed by the recesses 30, 32. The press thermal gluing process under the pressure is also performed at a temperature which is higher by about 40° C. to 50° C. than the yield temperature $T_D$, in the same manner as in the press forming performed in the step S5.

Subsequently, in the step S9, the heat treatment is performed in order that the crystalline nucleuses are generated in the manufactured housing 34 to cause crystallization.

Figure 11:
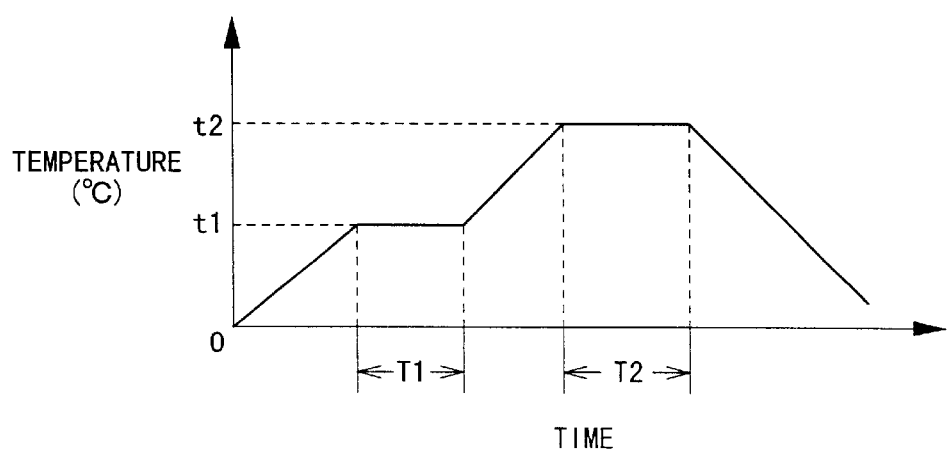
FIG. 11 shows a graph illustrating a time schedule for the heat treatment performed to cause crystallization.

An example of the heat treatment will be explained. As shown in FIG. 11, the temperature is raised from the room temperature to the primary crystallization temperature t1 at a temperature-raising speed of 50° C. to 200° C./hour, followed by being held for a certain period of time T1. Accordingly, the crystalline nuclei are formed in the housing 34. After that, the temperature is raised to the secondary crystallization temperature t2 at a temperature-raising speed of 50° C. to 200° C./hour, followed by being held for a certain period of time T2. Accordingly, the crystals grow in the housing 34. Subsequently, the temperature is lowered to the room temperature at a temperature-lowering speed of, for example, 50° C. to 200° C./hour.

The application of the heat treatment for the purpose of crystallization as described above allows the housing 34 to be converted into an aggregate of a large number of uniform microcrystals. As a result, it is possible to obtain the high bending strength which is not less than three times that of the glass.

Figure 3:
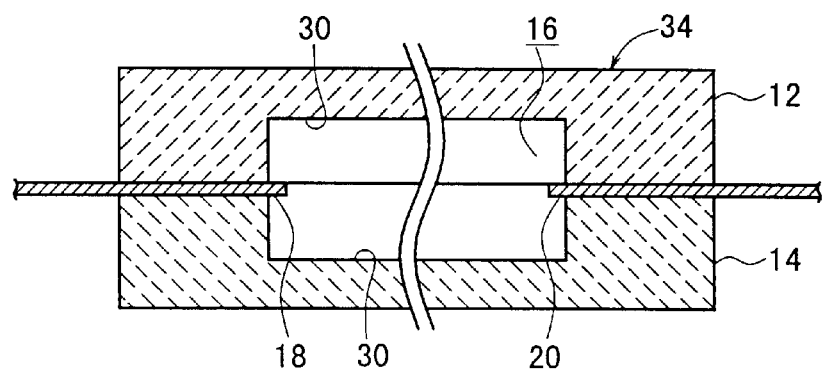
FIG. 3 shows a longitudinal sectional view illustrating the arrangement of the light emitting element according to the first embodiment.

Next, a light emitting element 10B according to the second embodiment will be explained with reference to FIGS. 12 to 19. Components or parts corresponding to those shown in FIGS. 1 to 3 are designated by the same reference numerals, duplicate explanation of which will be omitted.

Figure 12:
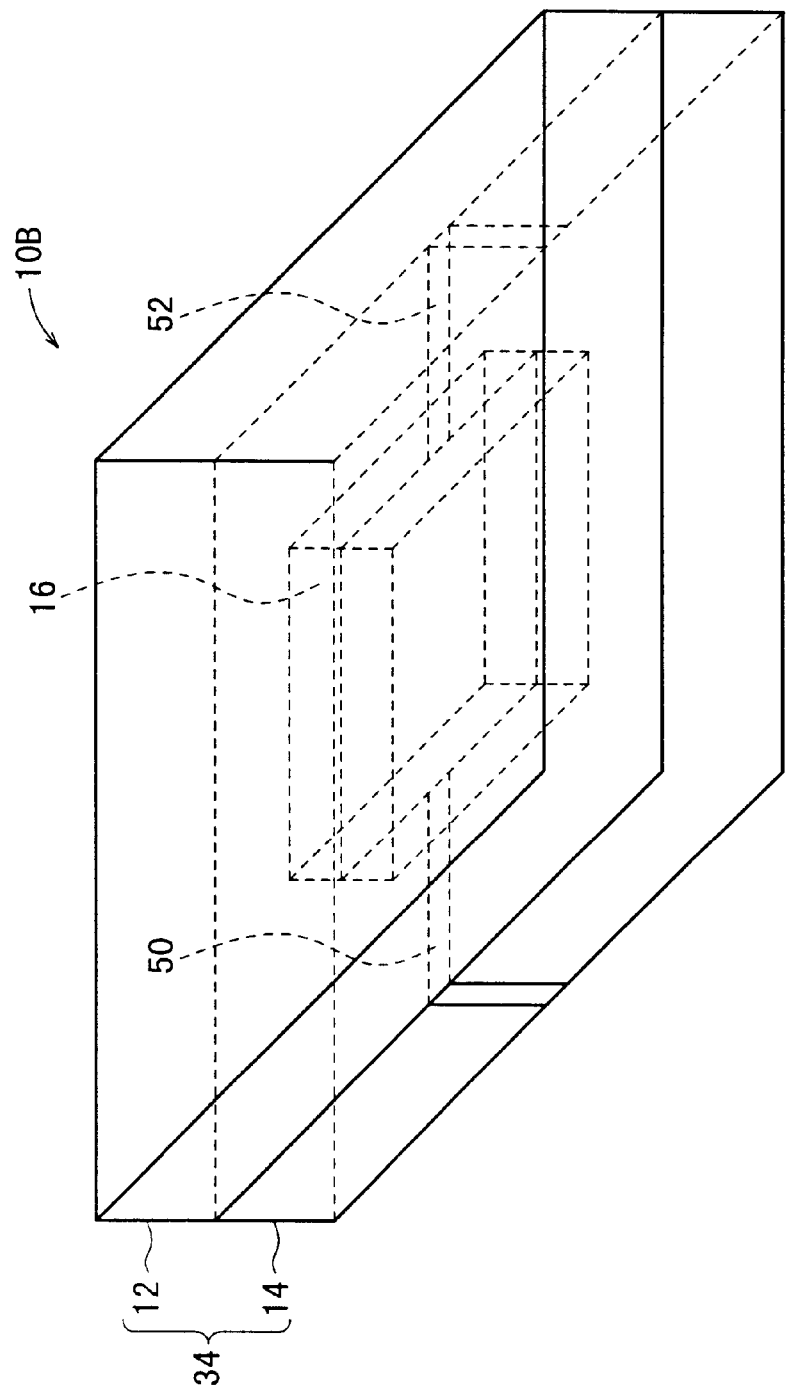
FIG. 12 shows a perspective view illustrating an arrangement of a light emitting element according to a second embodiment.
Figure 13:
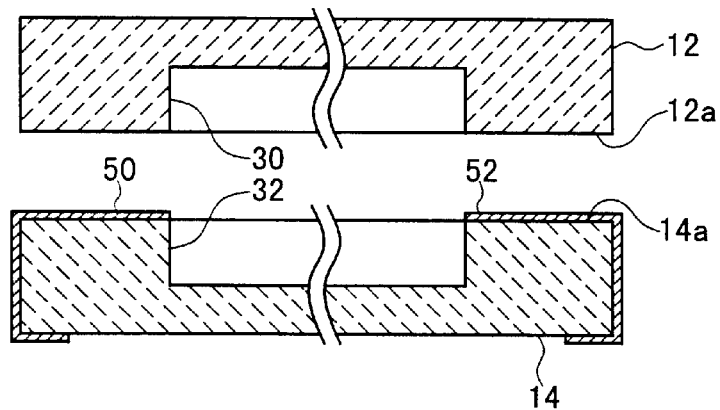
FIG. 13 shows an exploded sectional view illustrating the arrangement of the light emitting element according to the second embodiment.
Figure 14:
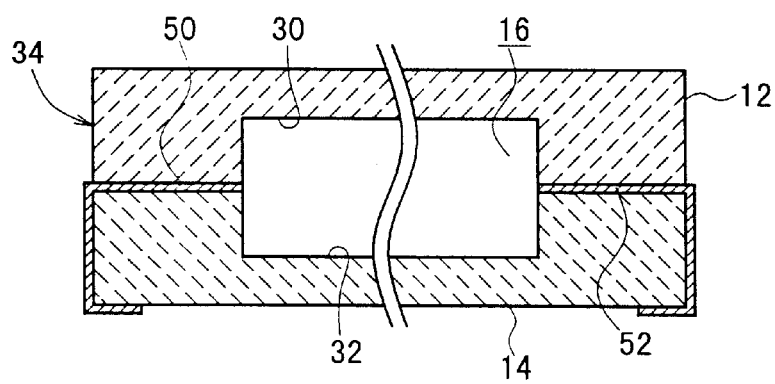
FIG. 14 shows a longitudinal sectional view illustrating the arrangement of the light emitting element according to the second embodiment.

As shown in FIGS. 12 to 14, the light emitting element 10B according to the second embodiment is constructed in approximately the same manner as the light emitting element 10A according to the first embodiment described above (see FIG. 1). However, the former is different from the latter in that the anode and the cathode are not constructed by the lead wires 18, 20, but the anode and the cathode are constructed by thin films 50, 52 containing metal.

Especially, in the second embodiment, in order to facilitate the connection to an unillustrated interface circuit, the respective thin films 50, 52 for constructing the anode and the cathode are formed over the contact surface 14a to the outer circumferential surface of the lower housing member 14.

The method for forming the thin films 50, 52 on the contact surface 14a of the lower housing member 14 includes, for example, a method in which they are formed by printing a paste based on the use of a glass powder and a high melting point metal (for example, tungsten and molybdenum), and a method in which they are formed by using a sheet member comprising a metal foil formed on, for example, a film-shaped resin strip to stick the metal foil of the sheet member, for example, to the contact surface 14a of the lower housing member 14, followed by peeling off the resin strip other than the metal foil.

Also in the light emitting element 10B according to the second embodiment, it is possible to simultaneously realize the integration and the miniaturization of the electronic tube, and it is possible to make the display expression for information transmission at a high brightness, in the same manner as in the light emitting element 10A according to the first embodiment.

Especially, in the light emitting element 10B according to the second embodiment, the anode and the cathode are constructed by using the thin films 50, 52. Therefore, the labor for the wiring arrangement is reduced, and it is possible to simplify the production steps, as compared with the case in which the anode and the cathode are constructed by using the lead wires 18, 20. Further, the positioning can be easily achieved in order that the anode and the cathode are opposed to one another with the cavity 16 interposed therebetween.

Next, several modified embodiments of the light emitting element 10B according to the second embodiment will be explained with reference to FIGS. 15 to 19.

Figure 15:
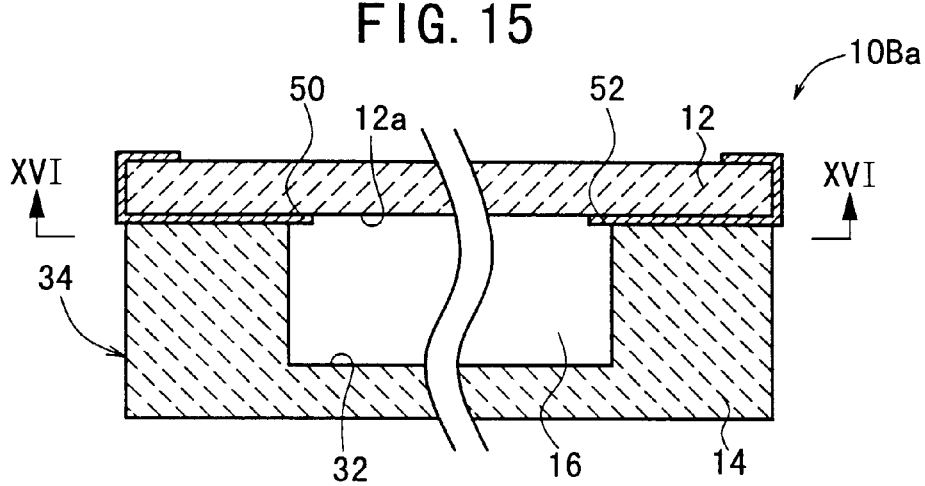
FIG. 15 shows a longitudinal sectional view illustrating a first modified embodiment of the light emitting element according to the second embodiment.
Figure 16:
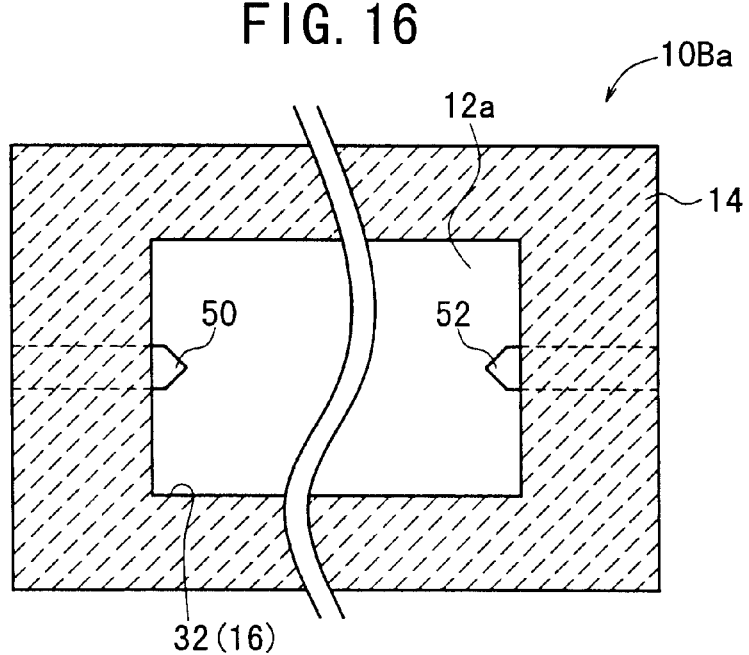
FIG. 16 shows a sectional view taken along a line XVI—XVI shown in FIG. 15.

At first, as shown in FIG. 15, a light emitting element 10Ba according to a first modified embodiment differs in hat the recess 32 is provided on only the lower housing member 14, and the anode and the cathode are formed by the thin films 50, 52 on the first principal surface 12a of the upper housing member 12. In this embodiment, as shown in FIG. 16, the cavity 16 is formed by the recess 32 and the first principal surface 12a of the upper housing member 12. Especially, forward ends of the thin films 50, 52 for constructing the anode and the cathode may be formed to have a sharp configuration. This arrangement is more preferred in that the discharge efficiency is improved.

Figure 17:
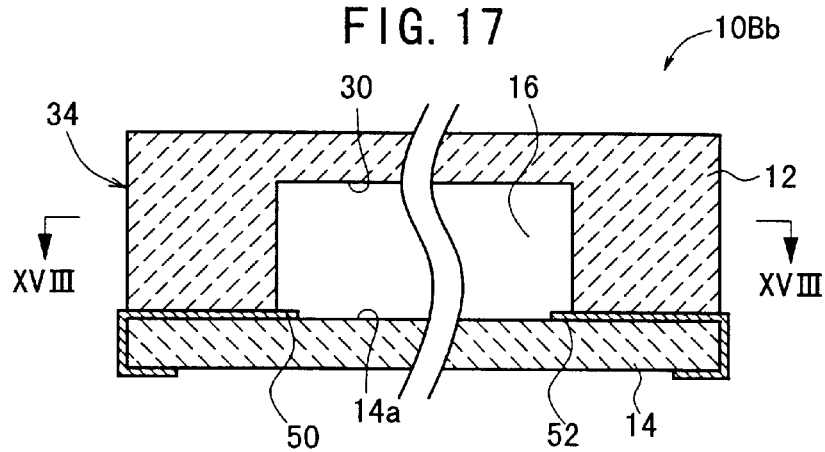
FIG. 17 shows a longitudinal sectional view illustrating a second modified embodiment of the light emitting element according to the second embodiment.
Figure 18:
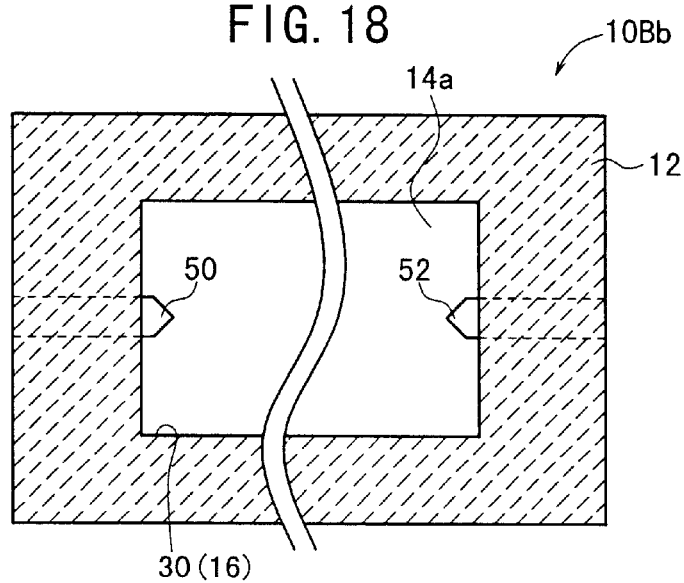
FIG. 18 shows a sectional view taken along a line XVIII—XVIII shown in FIG. 17.

Next, as shown in FIG. 17, a light emitting element 10Bb according to a second modified embodiment differs in that the recess 30 is provided on only the upper housing member 12, and the anode and the cathode are formed by the thin films 50, 52 on the first principal surface 14a of the lower housing member 14. Also in this embodiment, as shown in FIG. 18, the cavity 16 is formed by the recess 30 and the first principal surface 14a of the lower housing member 14. Especially, forward ends of the thin films 50, 52 for constructing the anode and the cathode may be formed to have a sharp configuration. This arrangement is more preferred in that the discharge efficiency is improved.

Figure 19:
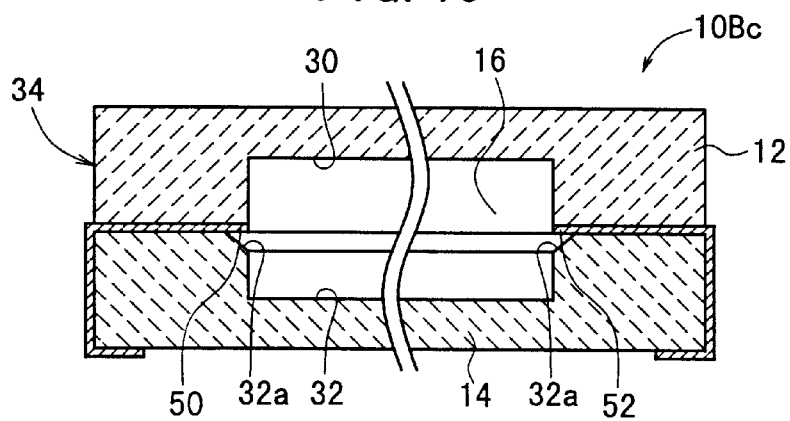
FIG. 19 shows a longitudinal sectional view illustrating a third modified embodiment of the light emitting element according to the second embodiment.

Next, as shown in FIG. 19, a light emitting element 10Bc according to a third modified embodiment differs in that a tapered surface 32a is formed at the circumferential edge of the recess 32 of the housing member (the lower housing member 14 in the illustrated embodiment) on which the anode and the cathode based on the thin films 50, 52 are not formed, of the upper housing member 12 and the lower housing member 14.

In this embodiment, it is possible to avoid the inconvenience which would otherwise occur such that the glass component of the lower housing member 14 covers the forward ends of the anode and the cathode constructed by the thin films 50, 52, during the discharge light emission. Thus, it is possible to contemplate the reliability of the discharge light emission.

Next, a method for producing the light emitting element 10B according to the second embodiment will be explained. This production method is carried out by executing approximately the same steps as those of the method for producing the light emitting element 10A according to the first embodiment shown in FIG. 9. However, the former is different from the latter in that the anode and the cathode of the thin films 50, 52 are formed in the electrode formation in the step S7 not by arranging the lead wires 18, 20 but by adopting, for example, the method based on the printing or the method based on the use of the sheet member as described above.

Figure 20:
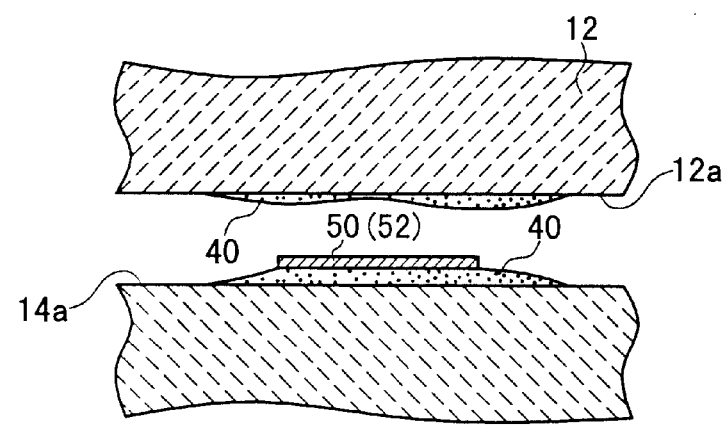
FIG. 20 illustrates an exemplary procedure for forming the thin film on the contact surface of the housing member.
Figure 21:
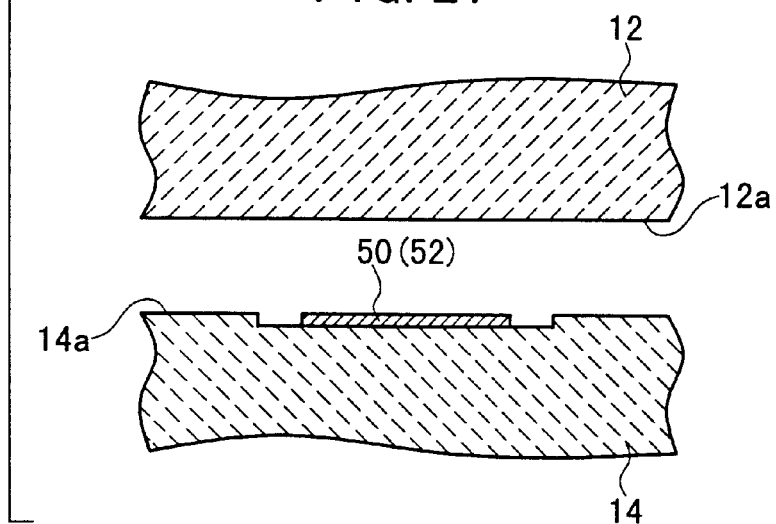
FIG. 21 illustrates another exemplary procedure for forming the thin film on the contact surface of the housing member.
Figure 22:
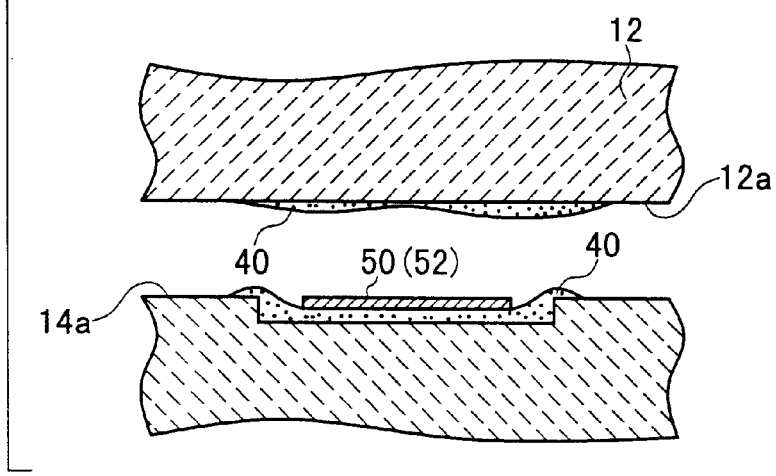
FIG. 22 illustrates still another exemplary procedure for forming the thin film on the contact surface of the housing member.

In this embodiment, it is possible to adopt, for example, a method in which the electrodes (the anode and the cathode) based on the thin films 50, 52 are formed, for example, by means of printing by the aid of a paste 40 made of glass material applied to the contact surface 14a of the lower housing member 14 as shown in FIG. 20, a method in which a groove 54 for the electrode extending from the outer surface to the recess 32 is previously formed, for example, on the contact surface 14a of the lower housing member 14 so that the anode and the cathode based on the thin films 50, 52 are formed in the groove 54 as shown in FIG. 21, and a method in which the paste 40 made of glass material is applied to the groove 54 and then the anode and the cathode based on the thin films 50, 52 are formed as shown in FIG. 22. The glass material paste 40 is preferably a paste having the same composition as that of the glass material for constructing the housing 34, for example, in view of thermal expansion. When the glass material paste 40 is used, it is preferable that the glass material paste 40 is also applied to the contact surface 12a of the upper housing member 12.

In the light emitting elements 10A and 10B according to the first and second embodiments described above (including the light emitting elements concerning the various modified embodiments), the upper housing member 12 and the lower housing member 14, each of which has the plate-shaped configuration, are joined to one another by means of thermal adhesion by pressing under the pressure to produce the plate-shaped housing 34. Alternatively, hemispherical housing members may be joined to produce a spherical housing. The shape of the housing 16 is not especially limited.

Xenon gas is used as the gas to be enclosed in the cavity 16 of the housing 34. Alternatively, it is possible to use other gases such as mercury and argon.

It is a matter of course that the light emitting element and the method for producing the same according to the present invention are not limited to the embodiments described above, which may be embodied in other various forms without deviating from the gist or essential characteristics of the present invention.

What is claimed is:

1. A light emitting element comprising:
   at least two confronting and thermally bonded glass plate members, at least one of said glass plate members having a plurality of cavities formed therein, said glass plate members being thermally bonded to each other;
   at least one gas and/or at least one light emitting substance enclosed inside each of said cavities; and
   mutually confronting electrodes disposed in each of said cavities, said electrodes comprising lead wires in contact with each of said two confronting and thermally bonded glass plate members, said lead wires being interposed between said glass plate members and fixed onto a surface of one of said glass plate members at a position at which said glass plate members contact each other.

2. The light emitting element according to claim 1, wherein said glass member has a bending strength of not less than 1000 kgf/cm$^2$.

3. The light emitting element according to claim 2, wherein each said glass member has a coefficient of thermal expansion which is substantially zero or which is near to a coefficient of thermal expansion of said electrode.

4. A method for producing a light emitting element, comprising:
   a first step of providing at least two glass plate members, at least one of said glass plate members having a plurality of cavities formed therein;
   a second step of providing electrodes by fixing lead wires on a contact surface of at least one of said glass plate members;
   a third step of confronting respective contact surfaces of said at least two glass plate members; and
   a fourth step of thermally bonding said glass plate members to each other under pressure in a predetermined atmosphere such that said lead wires are fixed on said contact surface at a position at which said glass plate members contact each other and said lead wires are in contact with each of said two confronting and thermally bonded glass plate members, said lead wires being interposed between said glass plate members,
   wherein at least one gas and/or at least one light emitting substance is enclosed inside each of said cavities, and said lead wires form mutually confronting electrodes in each of said cavities.

5. The method according to claim 4, wherein glass members each having a bending strength of not less than 1000 kgf/cm$^2$ are used as said glass members.

6. The method according to claim 5, wherein glass members each having a coefficient of thermal expansion which is substantially zero or which is near to a coefficient of thermal expansion of said electrode are used as said glass members.

* * * * *

UNITED STATES PATENT AND TRADEMARK OFFICE
CERTIFICATE OF CORRECTION

| | | |
|---|---|---|
| PATENT NO. | : 6,646,374 B1 | Page 1 of 1 |
| DATED | : November 11, 2003 | |
| INVENTOR(S) | : Norikazu Niimi and Michio Asai | |

It is certified that error appears in the above-identified patent and that said Letters Patent is hereby corrected as shown below:

<u>Column 1,</u>
Lines 27-28, please change "at the outdoor." to -- outdoors --

Signed and Sealed this

Thirtieth Day of December, 2003

JAMES E. ROGAN
*Director of the United States Patent and Trademark Office*